(12) United States Patent
Barsness et al.

(10) Patent No.: US 7,792,819 B2
(45) Date of Patent: Sep. 7, 2010

(54) PRIORITY REDUCTION FOR FAST PARTITIONS DURING QUERY EXECUTION

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 11/468,872

(22) Filed: Aug. 31, 2006

(65) Prior Publication Data

US 2008/0059405 A1 Mar. 6, 2008

(51) Int. Cl.
*G06F 17/30* (2006.01)
*G06F 15/16* (2006.01)

(52) U.S. Cl. ............... 707/713; 707/718; 707/719; 707/720; 707/721

(58) Field of Classification Search ............ 707/2
See application file for complete search history.

(56) References Cited

U.S. PATENT DOCUMENTS

| | | | | |
|---|---|---|---|---|
| 5,765,146 A | * | 6/1998 | Wolf et al. | 707/2 |
| 6,026,391 A | * | 2/2000 | Osborn et al. | 707/2 |
| 6,289,334 B1 | | 9/2001 | Reiner et al. | |
| 2005/0044064 A1 | * | 2/2005 | Haase | 707/3 |
| 2005/0251511 A1 | * | 11/2005 | Shankar et al. | 707/3 |
| 2007/0299812 A1 | * | 12/2007 | Salch | 707/2 |

OTHER PUBLICATIONS

Figueira, Silvia, Optimal Partitioning of nodes to space-sharing parallel tasks, avaliable online Apr. 17, 2006.*
Taniar, David and Leung, Clement, Query execution scheduling in parallel object-oriented databases, Oct. 2, 1998.*

* cited by examiner

*Primary Examiner*—Tony Mahmoudi
*Assistant Examiner*—Brittany N McCue
(74) *Attorney, Agent, or Firm*—Patterson & Sheridan, LLP (57) ABSTRACT

The present invention generally relates to data processing, and more specifically to executing a query against a partitioned database. The query may be executed against each partition of a database to retrieve results from each partition. The results from the partitions may be integrated to provide the results of the query. Each partition may take different amounts of time to retrieve results for the query. Embodiments of the invention allow adjusting the execution of the query for faster executing partitions to allow execution of other tasks, thereby increasing query throughput.

12 Claims, 5 Drawing Sheets

| PRIORITY | JOBS |
|---|---|
| | 410 |
| 1 | QUERY 210 |
| 2 | JOB A |
| 3 | JOB B |
| 4 | JOB C |
| 5 | JOB D |
| 6 | JOB E |
| 7 | JOB F |
| 8 | JOB G |

*Fig. 4B*

| PRIORITY | JOBS |
|---|---|
| | 420 |
| 1 | JOB A |
| 2 | JOB B |
| 3 | QUERY 210 |
| 4 | JOB C |
| 5 | JOB D |
| 6 | JOB E |
| 7 | JOB F |
| 8 | JOB G |

PRIORITY REDUCTION FOR FAST PARTITIONS DURING QUERY EXECUTION

BACKGROUND OF THE INVENTION

1. Field of the Invention

The present invention generally relates to data processing, and more specifically to executing queries against a partitioned database.

2. Description of the Related Art

Databases are computerized information storage and retrieval systems. A relational database management system (RDBMS) is a database management system (DBMS) that uses techniques for storing and retrieving data. The most prevalent type of database is the relational database, a tabular database in which data is defined so that it can be reorganized and accessed in a number of different ways.

Databases are typically partitioned to improve availability, performance, and scalability. Partitioning a database involves dividing the database or its constituent elements into distinct individual parts. For example, a database may be partitioned by building smaller separate databases, each with its own tables, indexes, transaction logs, etc. or by splitting a selected element, for example a field of a table. The database may be partitioned within a single server, or distributed or replicated across multiple servers. Therefore, database partitioning provides multiple benefits including scalability to support large databases, the ability to handle complex workloads, and increased parallelism.

When queries are run against a partitioned database, the query may be run against each partition. The results from each partition may then be integrated to provide the result for the query. To further improve performance of querying a database, the query may not be run against one or more partitions which are known to not contain results for the query. For example, a database may be partitioned based on location. The locations, for example, may be divided into 4 partitions, each partition being associated with data from one of the eastern states, western states, northern states, and southern states.

If a query containing a condition STATE='MAINE' is run against the database, the query need not be run against partitions containing data for southern and western states. Therefore, by eliminating the number of partitions against which a query is executed, the performance may be improved. However, even with elimination of partitions, the query may still be run against multiple partitions. For example, the above query may be executed against the northern states partition and the eastern states partition.

One problem with running a query against multiple partitions is that the response time for each partition may be different. For example, if the above query is run against the partitions containing data for the northern and eastern states, the northern states partition may take longer time to retrieve results than the southern states partition. Therefore, the response time of the query is governed by the slowest partition returning results to satisfy the query. Because some partitions may execute queries faster than others, critical resources may be unnecessarily used at the faster partitions. In other words, dedicating the critical resources to the above query, which is done at the expense of executing other queries, is inefficient because the complete result set for the above query is not returned to the user until the results from the slower partition are available. Furthermore, a significant amount of time may be wasted while waiting for the slower partition to retrieve results. Therefore overall query throughput may be adversely affected.

Accordingly, what is needed are improved methods, systems, and articles of manufacture for improving query throughput in a partitioned database environment.

SUMMARY OF THE INVENTION

The present invention generally relates to data processing, and more specifically to executing queries against a partitioned database.

One embodiment of the invention provides a method for managing the execution of a query in a partitioned environment. The method includes determining relative query execution times of the query for a plurality of data partitions. In this way, the fastest and/or slowest portioned may be identified, for example. An aspect of execution of the query is then adjusted for one or more of the partitions based on the relative query execution times. The query may then be executed in each of the plurality of data partitions, including the partition(s) for which the execution was adjusted.

In another embodiment, the method generally includes determining a query execution time for each partition of a partitioned data source, determining a partition with the longest query execution time, and for a partition other than the partition with the longest query execution time, adjusting execution of the query for the partition based on the longest query execution time.

Another embodiment of the invention provides a computer readable medium containing a program for executing a query which, when executed, performs an operation, generally including determining a query execution time for each partition of a partitioned data source, determining a partition with the longest query execution time, and for a partition other than the partition with the longest query execution time, adjusting execution of the query for the partition based on the longest query execution time.

Yet another embodiment of the invention provides a system, generally comprising memory including an application for executing a query; and a processor communicably connected to the memory. The processor, when executing the application is generally configured to determine a query execution time for each partition of a partitioned data source, determine a partition with the longest query execution time, and for a partition other than the partition with the longest query execution time, adjust execution of the query for the partition based on the longest query execution time.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally relates to data processing, and more specifically to executing a query against a partitioned database. The query may be executed against each partition of a database to retrieve results from each partition. The results from the partitions may be integrated to provide the results of the query. Each partition may take different amounts of time to retrieve results for the query. Embodiments of the invention allow adjusting an aspect of the execution of the query depending on the relative execution times of the query for the various partitions. In one aspect, adjusting an aspect of execution may allow execution of other tasks ahead of the query on the fastest partition, thereby improving efficiency.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

Figure 1:
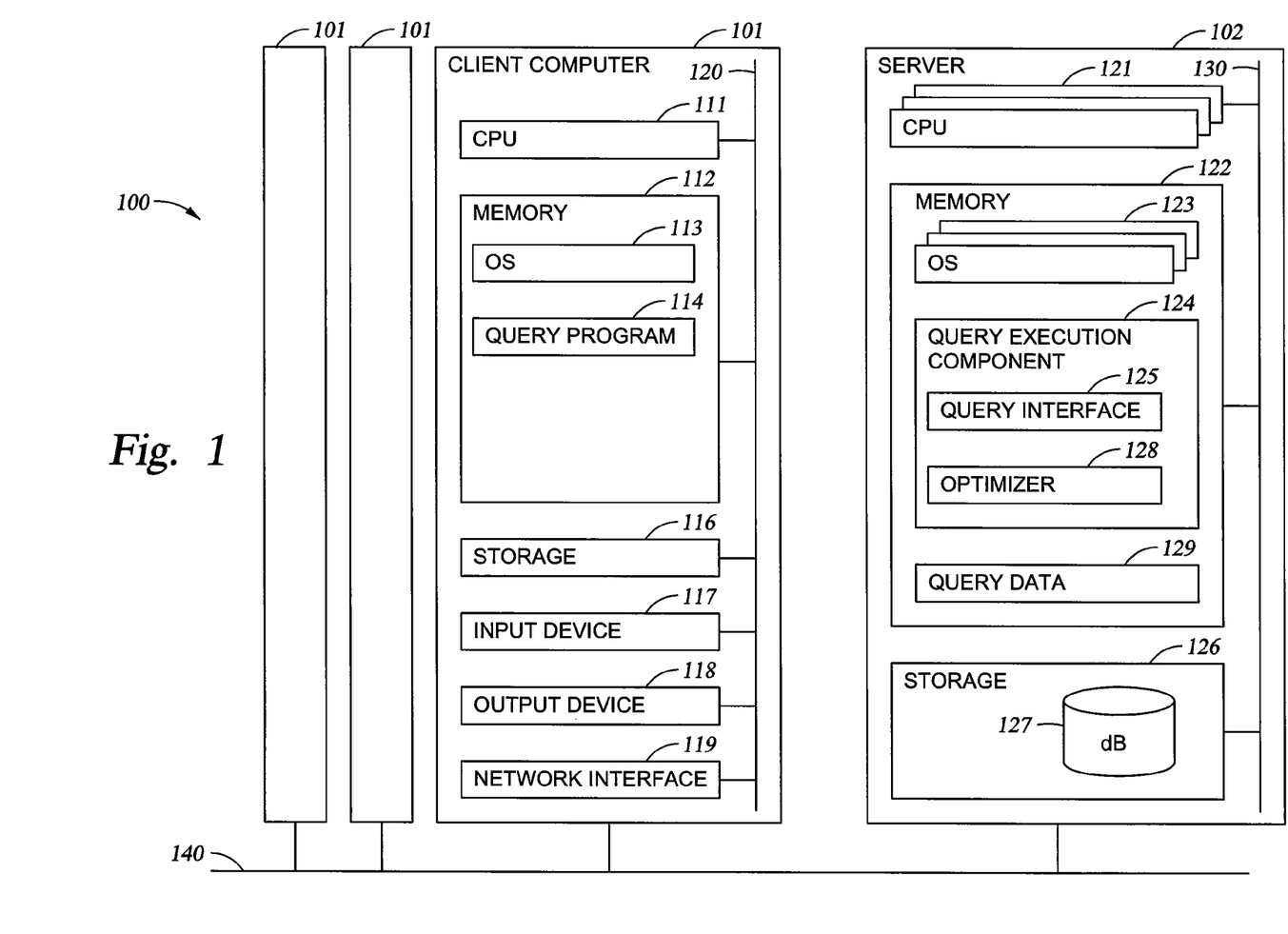
FIG. 1 is an illustration of an exemplary system according to an embodiment of the invention.

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for querying a server 102. In one embodiment, the query program 114 includes a web-based Graphical User Interface (GUI), which allows the user to display Hyper Text Markup Language (HTML) information. More generally, however, the query program may be a GUI-based program capable of rendering the information transferred between the client computer 102 and the server 102.

The server 102 may by physically arranged in a manner similar to the client computer 101. Accordingly, the server 102 is shown generally comprising one or more CPUs 121, a memory 122, and a storage device 126, coupled to one another by a bus 130. Memory 122 may be a random access memory sufficiently large to hold the necessary programming and data structures that are located on the server 102.

In one embodiment of the invention server 102 may be a logically partitioned system, wherein each partition of the system is assigned one or more resources available in server 102. Accordingly, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

While a logically partitioned system is described herein, one skilled in the art will recognize that embodiments of the invention are not limited to such logically partitioned systems. Embodiments of the invention may also be implemented in physically partitioned systems, non-partitioned systems, or any other reasonable system configuration.

The memory 122 may include a query execution component 124. The query execution component 124 may be a software product comprising a plurality of instructions that are resident at various times in various memory and storage devices in the computer system 100. For example, applications 124 may contain a query interface 125. The query interface 125 (and more generally, any requesting entity, including the operating system 123) is configured to issue queries against a database 127 (shown in storage 126).

Query execution component 124 may also include an optimizer 128. Optimizer 128 may determine the most efficient way to execute a query. For example, optimizer 128 may consider a plurality of access plans for a given query and determine which of those plans will be the most efficient. Determining efficiency of an access plan may include determining an estimated cost for executing the query. The cost may be determined, for example, by available memory, number of Input/Output (IO) operations required to execute the query, CPU requirements, and the like.

Database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment of the invention database 127 may be a partitioned database. Accordingly database 127 may be divided or broken into its constituent elements to create distinct individual parts. A database partition consists of its own data, indexes, configuration files, and transaction logs. A database partition is sometimes called a node or a database node. For example, database 127 may be partitioned by building smaller separate databases, each with its own tables, indexes, transaction logs, etc., or by splitting a selected element, for example a field of a table. Tables can be located in one or more database partitions. When a table's data is distributed across multiple partitions, some of its rows are stored in one partition, and other rows are stored in other partitions.

In one embodiment database 127 may contain one or more partitions of a larger database. Thus, in one embodiment, the individual partitions may be distributed over a plurality of servers (such as server 102. A query received from a client 102 may be executed against one or more of the partitions of the larger database contained in the one or more servers 102. Data retrieval and update requests are decomposed automatically into sub-requests, and executed in parallel among the applicable database partitions. The fact that databases are split across database partitions is transparent to users.

Typically, a single database partition exists on each physical component that makes up a computer. The processors on each system are used by the database manager at each database partition to manage its part of the total data in the database. Because data is divided across database partitions, the power of multiple processors on multiple computers may be used to satisfy requests for information. Data retrieval and update requests are decomposed automatically into subrequests and are executed in parallel among the applicable database partitions.

User interaction occurs through one database partition, known as the coordinator partition for that user. The coordinator runs on the same database partition as the application, or, in the case of a remote application, the database partition to which that application is connected. Any database partition can be used as a coordinator partition.

Memory 122 may also include query data 129. Query data 129 may include historical execution metrics for queries executed against one or more partitions of database 127. The execution metrics, for example, may include the query execution time for each partition of database 127.

Priority Reductions for Fast Partitions

Figure 2:
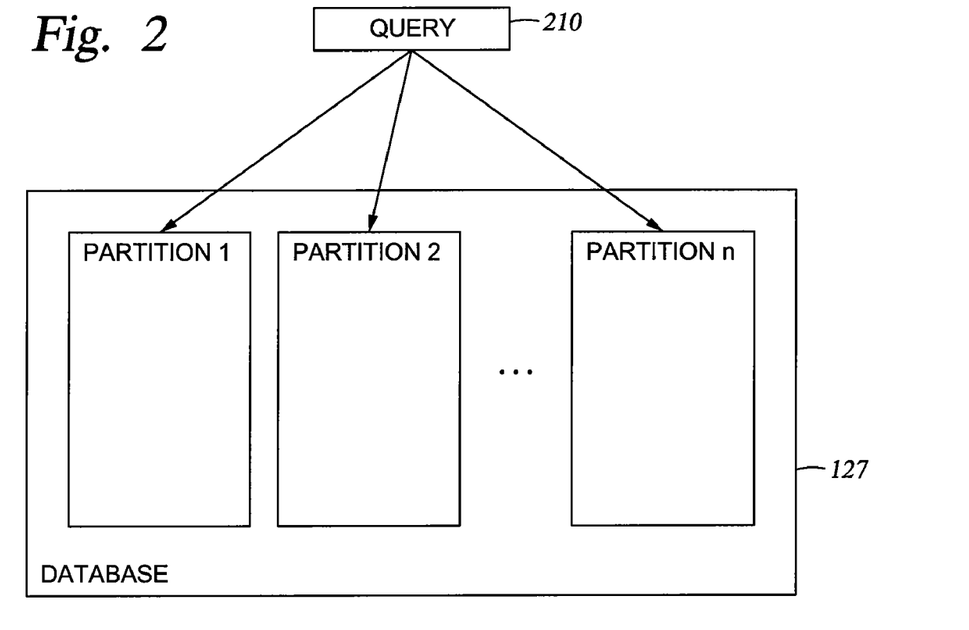
FIG. 2 is an illustration of a partitioned database, according to an embodiment of the invention.

FIG. 2 is a block diagram of a partitioned database 127. As illustrated database 127 may include a plurality of partitions. For example, Partitions 1, 2, ... n are shown. Executing a query against database 127 may involve running the query against one or more of the plurality of partitions. For example, query 210 may be run against each of the partitions 1-n. The results received from each partition may be combined to provide the results for query 210.

Query 210 may include a set of commands or clauses for retrieving data stored in database 127. Query 210 may come from a client computer 102, an operating system, or a remote system. Query 210 may specify columns of database 127 from which data is to be retrieved, join criteria for joining columns from multiple tables, and conditions that must be satisfied for a particular data record to be included in a query result set.

One skilled in the art will recognize that when query 210 is executed against each partition, each of partitions 1-n may take a different amount of time to retrieve results for the query. Factors affecting the time taken to retrieve results for a given partition may include the size of the partition, availability of a CPU to execute the query, clock speed, and the like.

Figure 3:
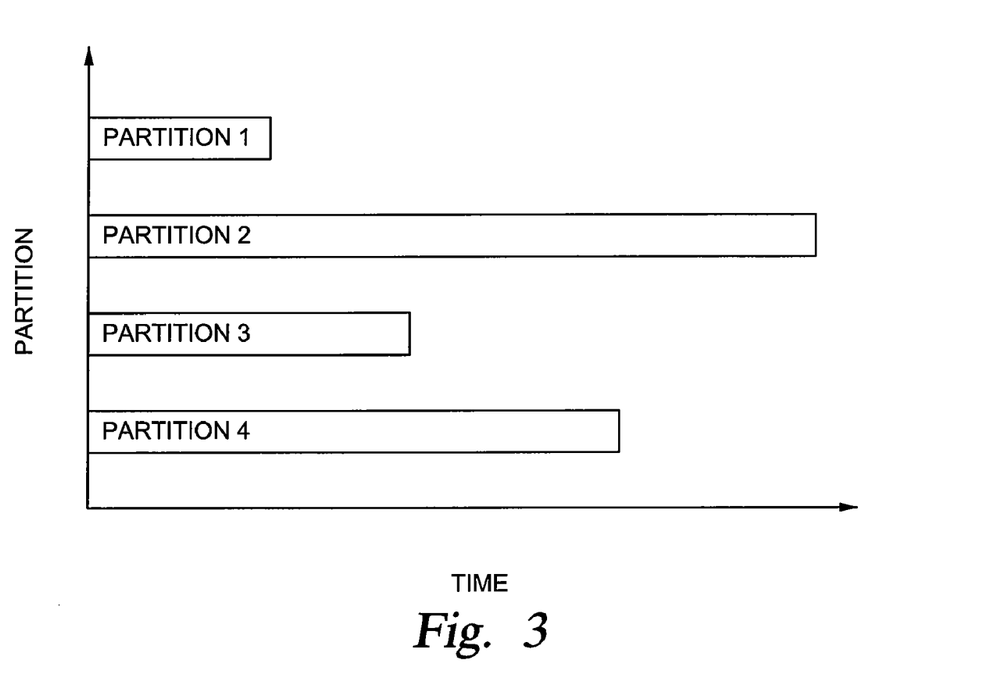
FIG. 3 is an exemplary timeline for execution of a query against a plurality of partitions, according to an embodiment of the invention.

FIG. 3 illustrates an exemplary timeline depicting the different times that may be taken by different partitions to retrieve results for a query. As illustrated Partition 1 takes the shortest time to retrieve results and Partition 2 takes the longest time to retrieve results. Therefore, Partition 2 is the slowest member of the partition group determining the query response time.

Because Partition 2 has the longest response time that determines the response time for the query, the query need not be executed at a high priority against the faster responding partitions. Therefore, embodiments of the invention provide for adjusting the execution of the query against faster running partitions to allow execution of other tasks, thereby increasing overall query throughput.

In one embodiment of the invention, modifying execution of the query may include adjusting the priority of the query. For example, the priority of a query at a faster responding partition may be reduced to allow more important tasks to be performed before executing the query. The more important tasks may include other queries or more generally any other jobs or processes being executed against the partition.

Figure 4A:
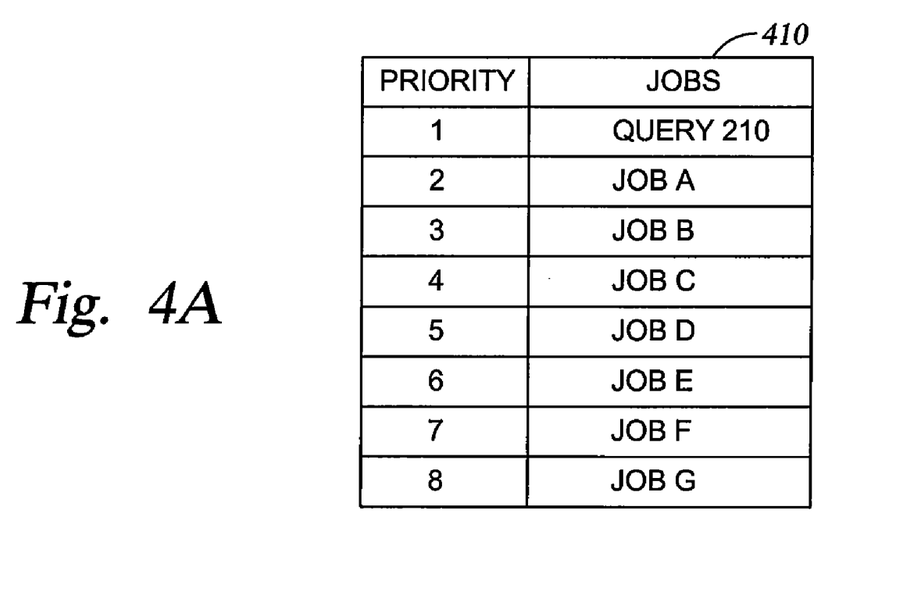
FIGS. 4A and 4B illustrate adjusting priority of execution of a query, according to an embodiment of the invention.
Figure 4B:
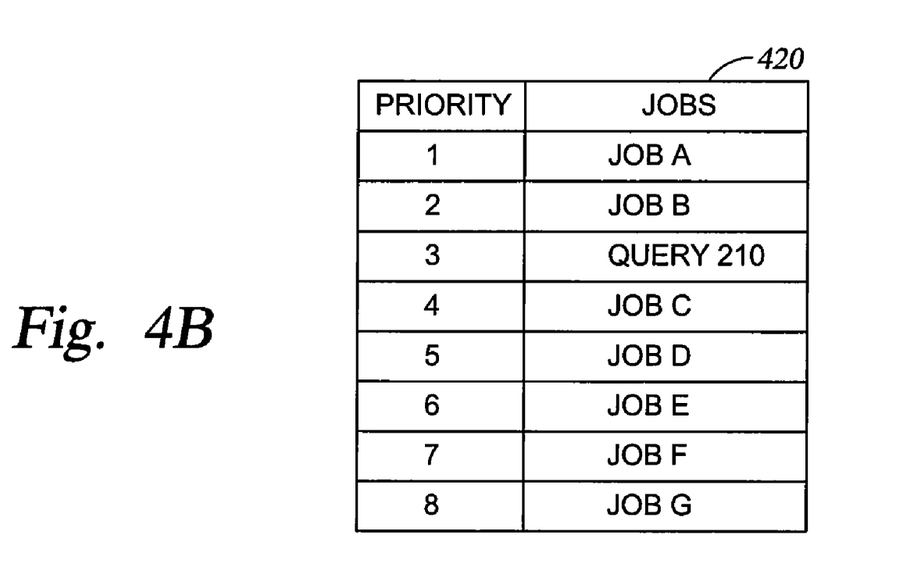

FIGS. 4A and 4B illustrate the adjustment of priority for query 210 at a faster running partition, for example, Partition 1 of FIG. 3. As illustrated in FIG. 4A, query 210 may have a high priority, as indicated by priority column 410. For purposes of illustration in FIG. 4A, lower priority values in column 410 are associated with higher priority of an associated job in column 420. For example, query 210 is shown having a priority value of 1, indicating that query 210 is scheduled to be executed first against Partition 1 (the faster partition). One skilled in the art will recognize, however, that any reasonable means for distinguishing priority of the jobs in column 420 may be utilized.

In response to determining that results may be retrieved faster from Partition 1 compared to Partition 2, the priority of execution of query 210 against Partition 1 may be adjusted to allow more critical jobs to execute ahead of query 210. For example, in FIG. 4B, the priority value of query 210 is adjusted to 3 to allow Job A and Job B to execute ahead of query 210.

The adjustment of priority of query 210 may depend on the criticality of other jobs in column 420. For example, if query 210 is determined to be the most critical job in column 420, the priority of query 210 may remain at 1. On the other hand, if more critical tasks are found in column 420, the priority of query 210 may be reduced to allow the critical task to execute ahead of query 210.

The adjustment of priority of query may also depend on the execution time of other tasks in column 420. For example, referring back to FIG. 4B, the priority of Jobs A and B may be adjusted to be higher than that of query 210 only if query 210 can still be executed within the response time of the slowest partition executing query 210.

Figure 5:
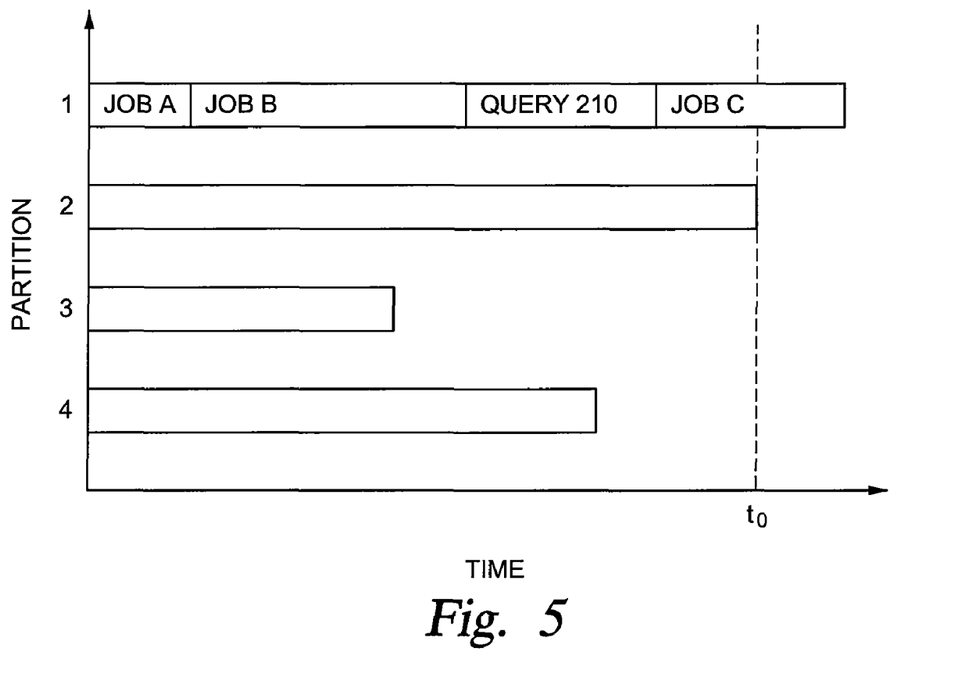
FIG. 5 is an exemplary timeline for execution of priority adjusted query, according to an embodiment of the invention.

FIG. 5 illustrates a timeline for execution of jobs according to FIG. 4B. As illustrated in FIG. 5, Jobs A and B are executed ahead of query 210 because of the adjustment of priority of query 210. Furthermore, the adjustment of priority is such that query 210 is executed within the query response time t0 determined by the execution time for query 210 at Partition 2. One skilled in the art will recognize that similar adjustment of priority of query 210 may also be performed at partitions 3 and 4 to allow other jobs to execute ahead of Query 210 at those partitions.

Figure 6:
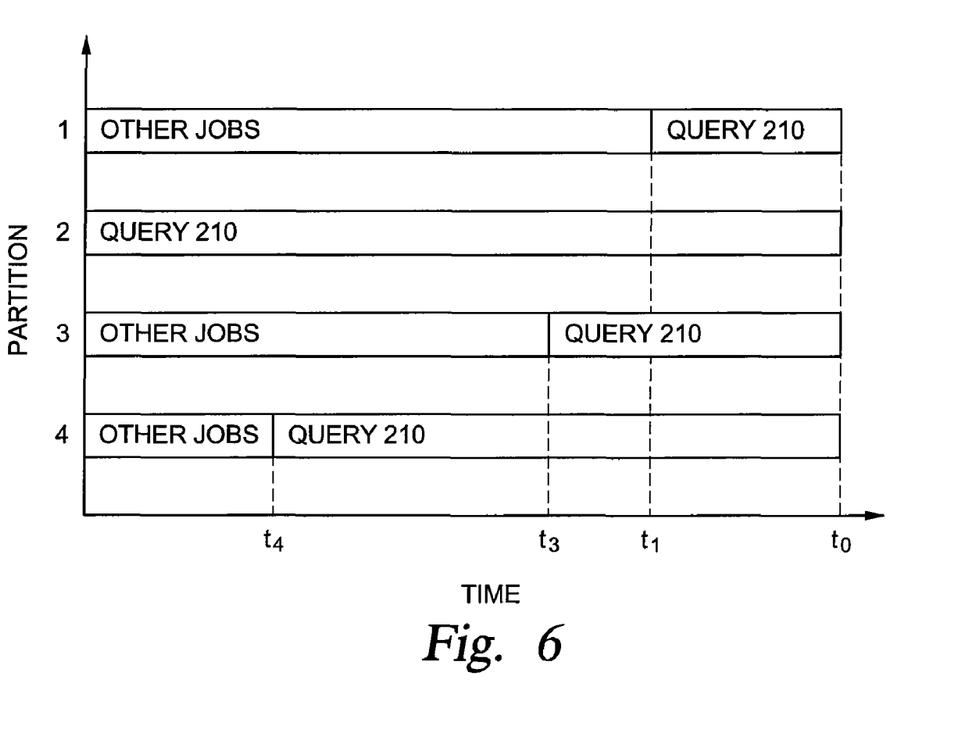
FIG. 6 is an exemplary timeline depicting delayed execution of a query, according to an embodiment of the invention.

In one embodiment of the invention, the execution of query 210 at a faster running partition may be delayed so that the execution of query 210 is completed at or near the time of completion of execution of query 210 at the slowest partition. FIG. 6 illustrates delaying of Partitions 1, 3, and 4 from FIG. 3 so that all partitions complete execution of query 210 at or near the same time. As illustrated, execution of query 210 is delayed till t1 for Partition 1, till t3 for Partition 3, and till t4 for partition 4, so that all partitions complete execution of query 210 at or near t0.

Determining the execution time for a query, or other jobs in column 420 may depend on historical execution data for the query and other jobs. For example, referring back to FIG. 1, query data 129 may include execution times for prior executions of a query, for example query 210. The historical data may be used to estimate the execution time for a future execution of the query. For example, the query execution time may be determined to be the average time of a predefined number of recent executions of the query.

In one embodiment, the query execution time may be determined by optimizer 128. For example, optimizer 128 may determine the available resources for execution of the query and a query access plan. Optimizer 128 may estimate query execution time based on the available resources and the selected query access plan.

In one embodiment of the invention, the query execution plan for query 210 may be adjusted in the faster executing partitions. In general, a query access plan contains low-level information indicating precisely what steps the system is to take to execute the query (e.g., using an index, a hash table, bit map, etc.). For any given query, there are a large number of possible access plans that may be chosen. Conventional optimizers, for example optimizer 128 in FIG. 1, are generally configured to determine the best access plan for each query they encounter, based on cost comparisons (i.e., estimated resource requirements, typically in terms of time and space) of available access plans. In selecting the access plan (and comparing associated costs), the optimizer may explore various ways to execute the query. For example, the optimizer may determine if an index may be used to speed a search, whether a search condition should be applied to a first table prior to joining the first table to a second table or whether to join the tables first.

One skilled in the art will recognize that different access plans may require different resources. For example, some access plans may require a greater use of memory, while other access plans may require a greater use of IO operations. The particular access plan selected may affect the time required to execute the query. Embodiments of the invention may affect access plan selection for a query executing against a faster running partition based on the availability of resources for executing the query.

For example, a query may be configured to execute according to a first access plan that utilizes a large amount of memory (relative to available memory and other operations needing memory). The first access plan may, if selected, may execute the query in the shortest amount of time. If it is determined that memory is scarce, a second access plan may be selected that is less memory-intensive. Therefore, other jobs with more critical memory needs may be executed without interference by the query, thereby improving throughput and performance.

Figure 7:
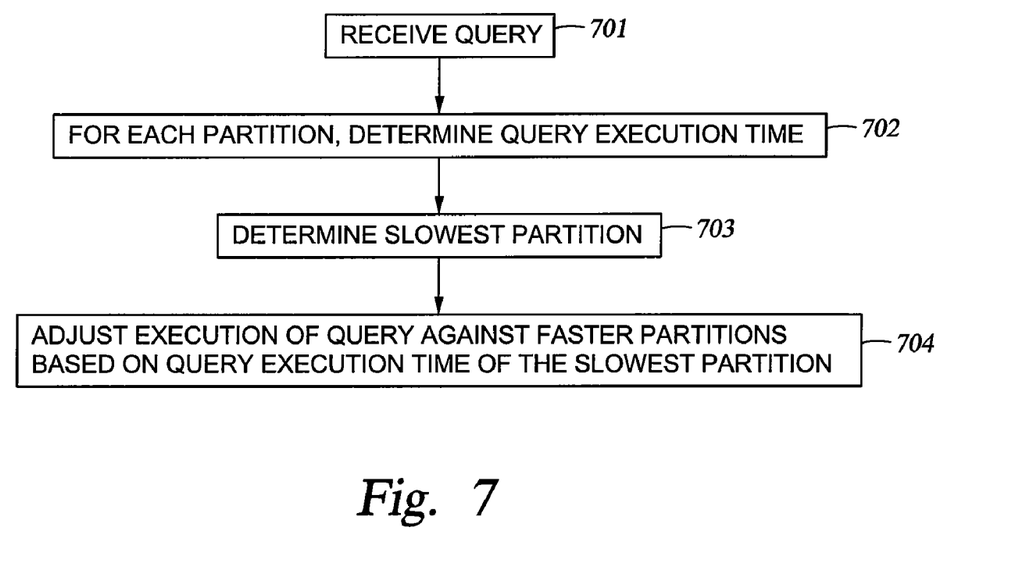
FIG. 7 is a flow diagram illustrating exemplary operations performed for executing a query against a partitioned database, according to an embodiment of the invention.

FIG. 7 is a flow diagram of exemplary operations performed by query execution component 124 to execute a query, for example query 210, against a partitioned database. The operations begin in step 701 by receiving a query. In step 702, the query execution time may be estimated for each partition against which the query will be executed. As described earlier, the query execution time for each partition may be estimated based on historical data or by an optimizer. Based on the estimated query execution times of step 702, the slowest partition may be determined in step 703. The slowest running partition may determine the execution time for the query.

In step 704, the execution of the query in the faster running partitions may be adjusted based on the execution time of the slowest running partition. Adjusting execution of the query may include adjusting the priority of the query, delaying execution of the query, or adjusting the query access plan as described previously. It should be noted that while adjusting an aspect of query execution in a fastest partition is described, it is also contemplated that query execution a relatively slower partition (e.g., the slowest partition) may be adjusted. For example, the priority of execution in the slowest partition may be increased.

CONCLUSION

By adjusting execution of a query in faster partitions, embodiments of the invention allow the processing of other critical jobs, for example other queries, at the faster running partitions without interference from the query. Therefore, the overall query throughput may be improved.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a query for execution in each of a plurality of data partitions of a partitioned data source, wherein each data partition contains a different subset of the data, and wherein each data partition contains at least some different data relative to the other data partitions of the data source;
determining query execution times of the query for each of the plurality of data partitions of the data source;
based on the determined query execution times and for one or more data partitions other than the data partition with the longest query execution time, postponing execution of the query in each of the respective one or more data partitions to a respective extent such that results from executing the query in the respective one or more data partitions are received closer to a time query results are received from the data partition with the longest query execution time; wherein postponing execution of the query comprises adjusting a priority of the query in at least one of the data partitions to allow one or more tasks other than the query to execute prior to execution of the query in the at least one of the data partitions; and
executing the query in each of the plurality of data partitions of the data source.

2. The method of claim 1, wherein determining the query execution time for each partition comprises determining an average execution time of the query based on historical executions of the query.

3. The method of claim 1, wherein determining the query execution time comprises determining the availability of resources and an access plan to execute the query.

4. The method of claim 1, further comprising:
determining that one or more resources required for execution of the query is likely to be unavailable; and
determining a first access plan to execute the query instead of a predetermined second access plan, wherein the first access plan reduces access of the one or more resources while executing the query in comparison to the predetermined second access plan.

5. A computer readable storage medium containing a program for executing a query which, when executed, performs an operation comprising:
receiving a query for execution in each of a plurality of data partitions of a partitioned data source, wherein each data partition contains a different subset of the data, and wherein each data partition contains at least some different data relative to the other data partitions;
determining query execution times of the query for each of the plurality of data partitions of the data source;
based on the determined query execution times and for one or more data partitions other than the partition with the longest query execution time, postponing execution of the query in each of the respective one or more data partitions to a respective extent such that results from executing the query in the respective one or more data partitions are received closer to a time query results are received from the data partition with the longest query execution time; wherein postponing execution of the query comprises adjusting a priority of the query in at least one of the data partitions to allow one or more tasks other than the query to execute prior to execution of the query in the at least one of the data partitions; and
executing the query in each of the plurality of data partitions of the data source.

6. The computer readable storage medium of claim 5, wherein determining the query execution time for each partition comprises determining an average execution time of the query based on historical executions of the query.

7. The computer readable storage medium of claim 5, wherein determining the query execution time comprises determining the availability of resources and an access plan to execute the query.

8. The computer readable storage medium of claim 5, the operation further comprising:
determining that one or more resources required for execution of the query is likely to be unavailable; and
determining a first access plan to execute the query instead of a predetermined second access plan, wherein the first access plan reduces access of the one or more resources while executing the query in comparison to the predetermined second access plan.

9. A system, comprising:
a memory comprising an application for executing a query; and
a processor communicably connected to the memory, which, when executing the application is configured to perform an operation comprising:
receiving a query for execution in each of a plurality of data partitions of a partitioned data source, wherein each data partition contains a different subset of the data, and wherein each data partition contains at least some different data relative to the other data partitions of the data source;
determining query execution times of the query for each of the plurality of data partitions of the data source;
based on the determined query execution times and for one or more data partitions other than the partition with the longest query execution time, postponing execution of the query in each of the respective one or more data partitions to a respective extent such that results from executing the query in the respective one or more data partitions are received closer to a time query results are received from the data partition with the longest query execution time; wherein postponing execution of the query comprises adjusting a priority of the query in at least one of the data partitions to allow one or more tasks other than the query to execute prior to execution of the query in the at least one of the data partitions; and executing the query in each of the plurality of data partitions of the data source.

10. The system of claim 9, wherein the processor is configured to determine the query execution time for each partition by determining an average execution time of the query based on historical executions of the query.

11. The system of claim 9, wherein the processor is configured to determine the query execution time by determining the availability of resources and an access plan to execute the query.

12. The system of claim 9, wherein to adjust execution of the query the processor is configured to:
   determine that one or more resources required for execution of the query is likely to be unavailable; and
   determine a first access plan to execute the query instead of a predetermined second access plan, wherein the first access plan reduces access of the one or more resources while executing the query in comparison to the predetermined second access plan.

\* \* \* \* \*